Nov. 30, 1943.    C. E. FRASER    2,335,749
RAKE AND CLEANER FOR FILTER BEDS
Filed July 22, 1939    2 Sheets-Sheet 1
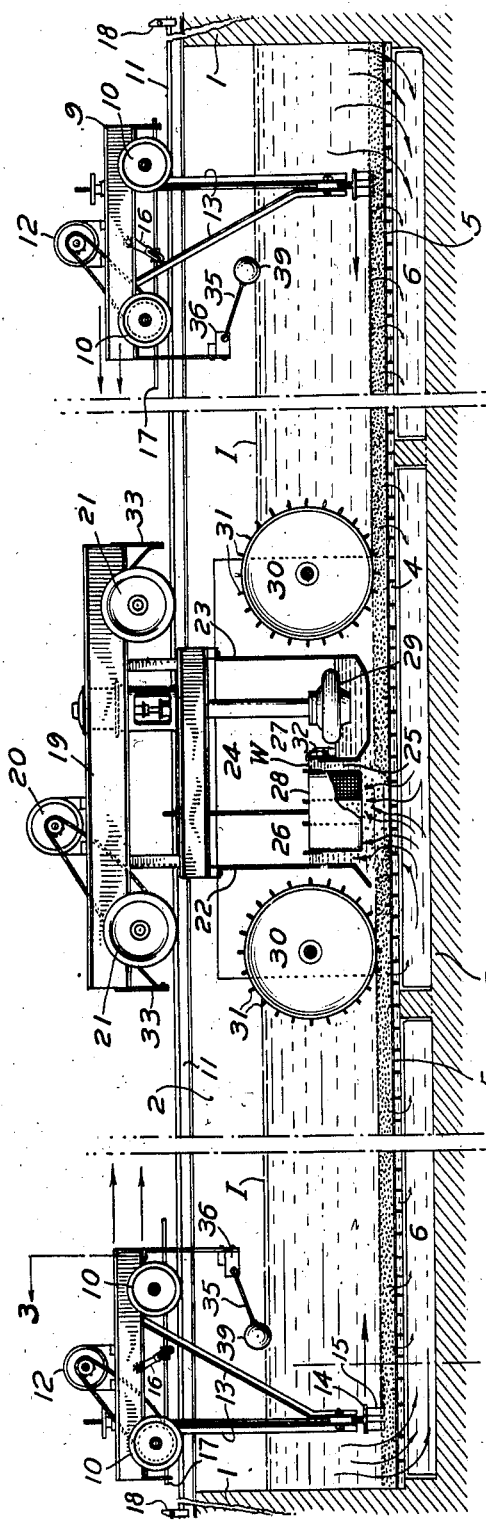
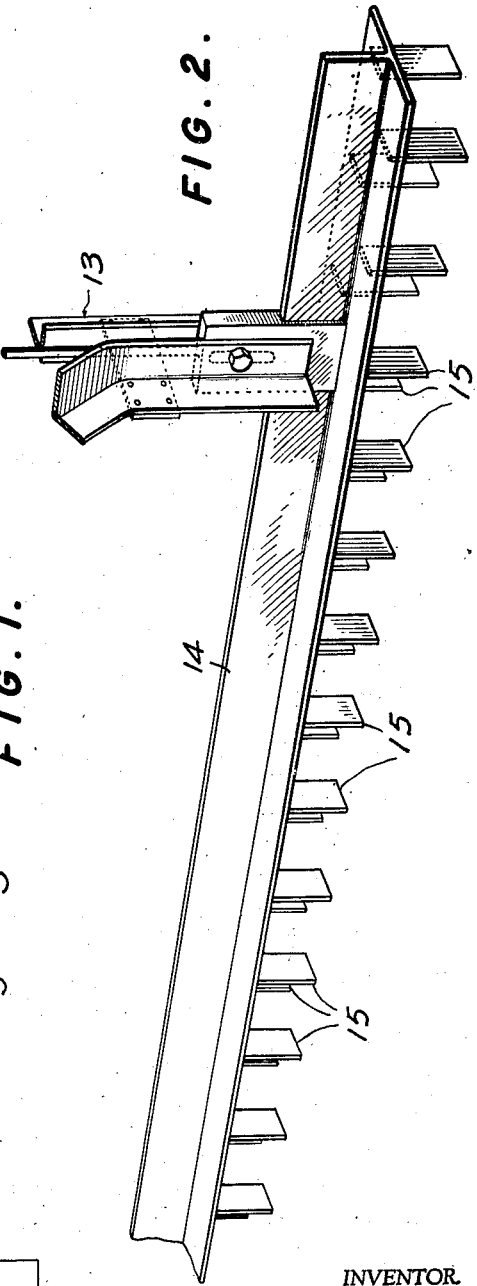
INVENTOR.
CHARLES E. FRASER,
BY
ATTORNEY.

Nov. 30, 1943.   C. E. FRASER   2,335,749
RAKE AND CLEANER FOR FILTER BEDS
Filed July 22, 1939   2 Sheets-Sheet 2

INVENTOR.
CHARLES E. FRASER,
BY
ATTORNEY.

Patented Nov. 30, 1943

2,335,749

UNITED STATES PATENT OFFICE 2,335,749

RAKE AND CLEANER FOR FILTER BEDS

Charles E. Fraser, Kew Gardens, N. Y.

Application July 22, 1939, Serial No. 285,939

18 Claims. (Cl. 210—128)

The present invention relates to a method of and mechanism for cleaning filter beds.

It is common practice in the treatment of sewage, industrial wastes, etc. to pass liquids containing the same through relatively shallow beds of sand, aggregate or the like, which removes the solids therefrom. Such beds, in the course of time, become clogged with the retained material, even though the raw material undergoing treatment has been subjected to preliminary sedimentation or the like. As a consequence, it becomes necessary to restore the bed to somewhere near its initial solid removal capacity and this may be done by cleaning it either intermittently or continuously.

A popular type of cleaning mechanism for the above purpose consists of a traveling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydraulic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

Actual operations in the field of downflow filters have indicated certain limitations such as the fact that for hydraulic reasons, it is impracticable to deliver to the surface of the bed more than a certain maximum of sewage per square foot of bed per minute, no matter how small the suspended solids content of the sewage may be. This maximum is, therefore, the peak load of the filter bed and the normal rate must consequently be considerably less. The limitation of capacity of upflow filters is even more severe for other reasons, as an excessive rate of upflow lifts the filtering aggregate "en masse" instead of flowing smoothly through the interstices.

Again, it has been found impracticable to operate a submerged cleaner faster than at a certain speed. This is due to the fact that if the cleaner mechanism moves faster than this maximum, it pushes a wall of settled sewage from the top of the bed ahead of it, the movement of which might erode the surface of the bed material itself. This disturbance, added to the other hydraulic disturbances of the bed material, is something to be avoided.

Inasmuch as these cleaning devices may not operate as fast as would be desirable under the circumstances, it follows either that the flow of influent must be reduced, additional cleaners must be provided or additional sewage systems or filters installed.

It is the principal object of the present invention, therefore, to provide means whereby the efficiency of these cleaning devices may be stepped up to the point that the beds have increased capacity and, consequently, can take care of greater flow of influent containing a greater quantity of solids than would be possible heretofore, all without increasing the size or number of the cleaning mechanisms themselves and while retaining the beds in their normal area and at uniform level and thickness.

It has been found that the choking of a filter bed is due primarily to the retaining of solids at the surface with which the influent first contacts. That is, the retained solids are not equally distributed throughout the bed material, but on the contrary, form a rather thin film or skin on the bed while the remainder of the bed thickness remains reasonably clean. Under such circumstances, it only becomes necessary to break up this surface film or skin whereupon the bed is restored to nearly its normal capacity. As a consequence, this skin or film breaking procedure supplements the cleaning mechanism and makes it unnecessary for the cleaner to pass over the bed to completely clean the same as often as would be otherwise required. Of course, this surface operation is useful only as a temporary expedient, for eventually the deep cleaner such as above described must be used to cleanse the bed material all the way down to the wire on which it is supported.

To this end, the invention, in one of its broadest aspects, contemplates the provision of a movable rake particularly adapted for use with downflow filters where the rake will move to and fro over beds of either rectangular or circular type, the teeth of the rake penetrating the bed material to the desired extent to break up the film there formed. The bed at this point is thereby restored to a reasonable efficiency until the cleaner can completely purge the bed material of the retained solids.

The invention further contemplates in a rectangular bed, the use of a cleaner which will operate back and forth as is usual, in combination with one or more movable rakes operating between the cleaner mechanism and the end walls of the tank. Means are provided for automatically changing the direction of movement of the rakes when they contact either with an end wall or with the cleaner, no matter where that cleaner may be located. By using two such rake mechanisms, one on each side of the cleaner, a particularly efficient combination is provided.

In circular beds, the same type of combination mechanism may be provided using one or more rakes which will travel back and forth around the bed, either carried along with the cleaner or independently mounted. In the case of one rake independently mounted and driven, its direction may be changed by suitable mechanism operating upon contact with one end of the cleaner and when it has completed its cycle, its direction of movement may again be changed by contact with the other end of the cleaner. On the contrary, two rakes may be provided, one on each side of the cleaner, so that their direction of travel is changed when they contact with opposite ends of the cleaner on one cycle and with each other on the return cycle. By operating these raking mechanisms at a lineal speed greater than that of the cleaner, the beds may be kept open longer, with increased flow rates and filtering efficiency without increasing the speed of travel of the deep cleaner and thus impairing its efficiency, either through lack of cleaning of the bed or disturbance of the settled solids or bed material.

The invention further contemplates the provision of means for automatically varying the speed of lineal travel of the rakes depending upon the need therefor and this mechanism may conveniently take the form of a float-operated control mechanism operated by the height of the influent. That is, through sudden inrush of a large volume of influent, during peak loads with undue rise of the influent level, these floats will automatically increase the speed of travel of the rakes and, consequently, the area of the beds not being deep cleaned may have the clogging surface film thereof broken up faster. Conversely, during low levels of influent, the speed of travel of the rakes may be slowed down or even stopped altogether. The invention also includes the idea of providing one or more rakes supplementing the deep cleaner on a circular bed but having these rakes propelled by radial arms attached to the deep cleaner. In this case, the rakes will travel at the same rate as the deep cleaner but will require no carriage or motor.

The invention further consists in the novel arrangement, combination and construction of parts more fully hereinafter described and shown in the accompanying drawings.

In the drawings:

Fig. 1 is a side elevation partly in section of a combination surface and deep cleaner mechanism constructed according to the present invention and applied in a rectangular tank;

Fig. 2 is a perspective detail of one of the rake elements;

Figure 3:
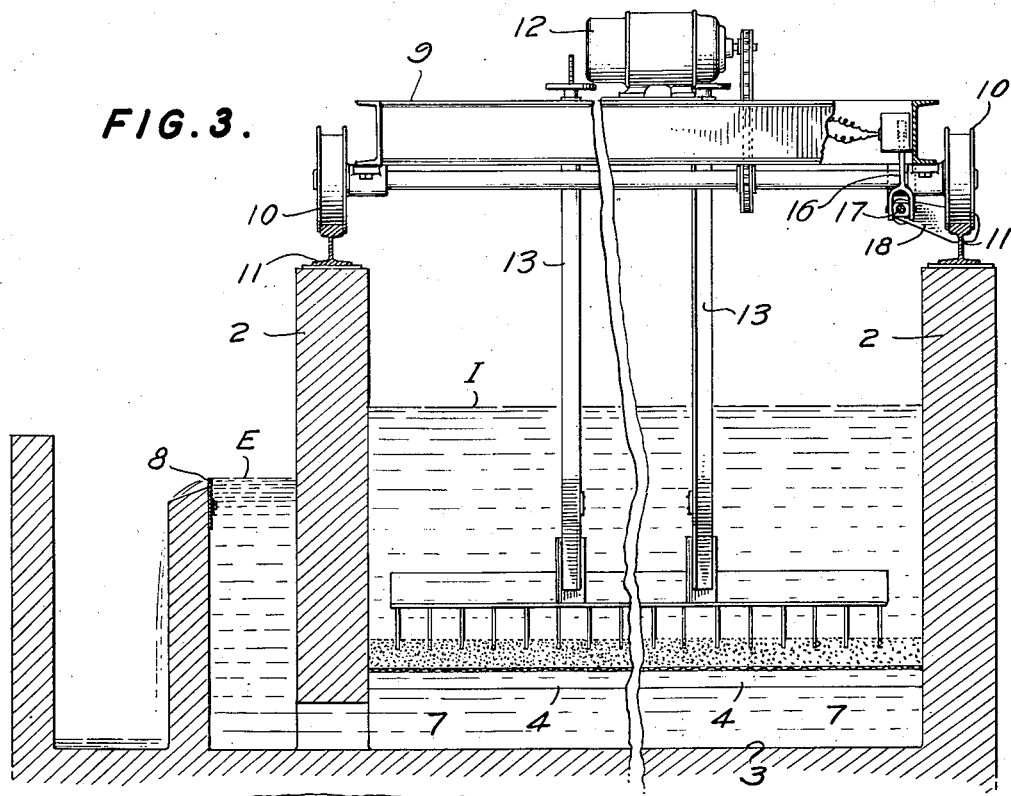
Fig. 3 is a sectional view taken along the line 3—3 of Fig. 1.

Referring now to Fig. 1, a rectangular tank having end walls 1, side walls 2 and bottom 3, carries a gridwork 4, supported on the latter. Upon this grid rests a screen 5 carrying a suitable thickness of filter bed material 6 of sand or other aggregate. For the purpose in hand, we will assume the sand to be of the magnetite variety.

Influent to be filtered either with or without preliminary treatment, such as sedimentation or the like, is flowed on top of the bed 6 until a suitable level I, above level E, has been reached. This hydraulic head causes movement of the liquid through the bed material 6, the latter retaining the solids so that clean effluent flows into the space 7 below the bed. The clean effluent then passes upwardly through a vertical channel and spills over an adjustable weir 8, which establishes an effluent level E lower than the influent level I. Due to the difference in hydraulic head between the two levels, the liquid is caused to flow through the bed. Adjustment of the weir 8 may be made at will and by any suitable means not shown to determine the relationship between these levels.

A surface raking mechanism or mechanisms for breaking up the film which gathers on the upper surface of the bed may consist of a carriage 9 mounted upon wheels 10 movable on a track 11 carried by the side walls 2. Motor 12 may be used to drive the carriage.

Depending from the bottom of the carriage is a framework 13, to the bottom of which is attached an inverted T 14 having a series of depending teeth 15 constituting a rake. As shown in Fig. 2, these teeth are arranged in a plurality of rows, the teeth in one row being staggered with relationship to those in another. The rake, hereinafter referred to generally as 15, may be vertically adjustable as shown, with respect to the bed so that the teeth thereof may clear or project into the bed any desired distance.

Current to the motor 12 is controlled by movement of a switch arm 16 and movable through rod 17 carried in suitable brackets beneath the carriage and projecting beyond each end thereof. The switching mechanism is such that when the arm 16 is in the position shown at the right hand end of Fig. 1, the motor will drive the carriage to the left, while when the arm is in the position shown at the left hand end of Fig. 1, the motor will drive the carriage to the right. An intermediate position cuts the motor off completely.

In rectangular tanks where these surface raking mechanisms have a back and forth movement, limit stops 18 are provided at each end of the tank or in any other location where desired so arranged that when the carriage reaches the end of its travel, the end of rod 17 will contact with stop 18 and the switch 16 thrown to an opposite position whereupon the motor will be reversed and the carriage and rake moved in the opposite direction.

A suitable cleaning mechanism may consist of a trolley 19 movable by motor 20 through wheels 21 also mounted on track 11. Depending from the trolley 19 is a caisson consisting of front wall 22, rear wall 23 and side walls 24. A partition 25 divides the caisson into an agitation compartment 26 and a wash water compartment 27. In the former is a solenoid 28 or other agitation causing means, while in the latter is a pump 29 for removing wash water therefrom.

The caisson makes a sealing contact with the filter bed for the purpose above described and this is accomplished at the sides by extending the side walls 24 into the bed material a sufficient distance and at each end through the instrumentality of hollow drums 30 suitably carried in the side walls 24 and making a watertight sliding connection therewith. The drums 30 are provided with a series of cleats 31 on the periphery thereof to facilitate a sealing contact with the bed.

The solenoid is connected to a suitable intermittent source of electrical energy so as to energize the same. Upon establishing this connection, the sand of the filter bed is magnetized and a section thereof bodily lifted up toward the solenoid, which loosens the dirt adherent to the sand. It is to be noted that by suitable adjustment of the relative height of the solenoid or the degree of magnetic force created therein, any amount of bed may be lifted, from a small amount to one completely down to the wire. As shown, we assume that a section of the bed down to the wire has been lifted. This causes an area of weakened resistance in the bed and due to the fact that the wash water level W, established by reason of adjustable weir 32 in wall 25, the clean effluent from below the bed flows up through this area of lessened resistance, washes the dirt loosened from the sand and spills over the top of the weir into the wash water compartment 24 from which it is removed by the pump 29. This backflow of liquid is caused by the difference in hydraulic head between the higher level E and the lower level W. When the solenoid 28 is de-energized, it releases the magnetite which drops back into the bed into its former position, thoroughly cleaned. The deep cleaning operation is then repeated intermittently until the entire area of the bed has been subjected to this purging action.

While this is going on, the rake mechanisms have been moving back and forth as above described. When either or both of them reach the end of their travel in proximity to the deep cleaner, the ends of switch rods 17 contact with stop plate 33. The switch arms 16 are moved to an opposite position, which reverses the direction of travel of the rake carriages.

Inasmuch as the raking mechanism, in breaking up the surface film on the bed, does restore the latter to somewhere near its original efficiency in opening up the same, and inasmuch as the surface film-forming rate may be dependent upon either the rate of flow of influent on top of the bed or its content of solids, it may be desirable under some circumstances to cause the rate of lineal travel of the rakes to be stepped up or slowed down. As the film builds up on the surface of the bed and thus tends to slow down the passage of liquid through the bed, the influent level I will rise. Consequently, a convenient mechanism for varying the speed of travel of the rakes may comprise a float 34 carrying a rod 35, operating a suitable speed switch 36. Consequently, as the influent level I rises, it causes upward movement of the float and thus speeds up the travel of the rakes. Conversely, as the level I drops, the float moves with it and the lineal movement of the rakes is reduced in speed a corresponding amount or even stopped altogether. In this way, the rakes may be made to keep the bed open by breaking up the surface film until the cleaner may travel thereover and completely purge the bed of retained solids. This makes unnecessary the speeding up of cleaner action and, consequently, it may be operated at a speed corresponding to its maximum efficiency.

Figure 4:
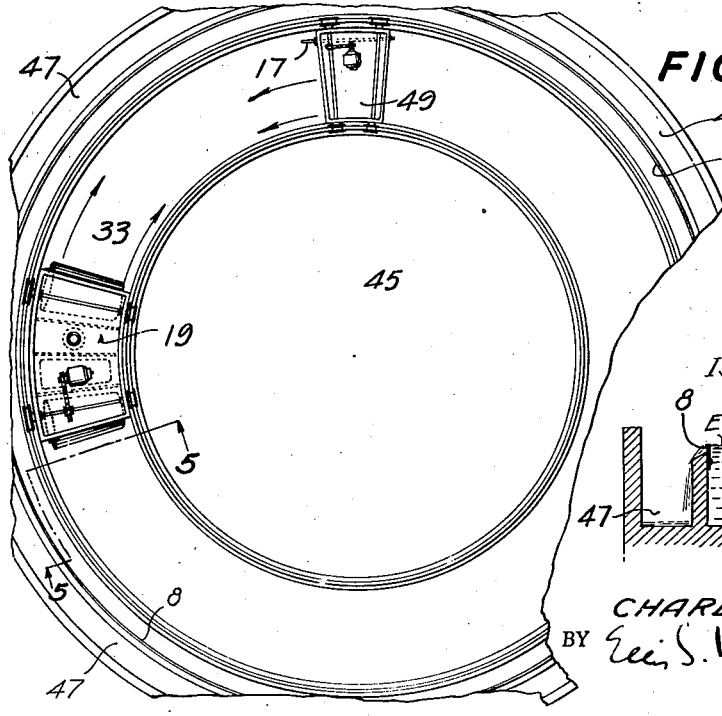
Fig. 4 is a plan view showing the combination of Fig. 1 as applied to an annular filter canal.
Figure 5:
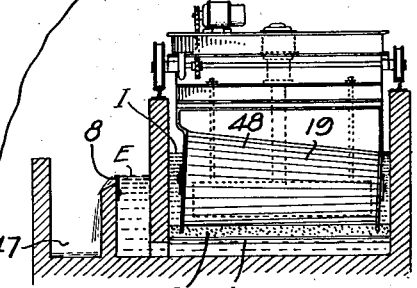
Fig. 5 is a sectional view along the line 5—5 of Fig. 4.

In Fig. 4, much the same arrangement is shown as applied to sewage treatment systems of the circular type. There a sedimentation tank is shown generally at 45 equipped with the usual rakes and sedimentation apparatus not shown because it plays no part in the present invention. The treated liquid from the sedimentation zone, which constitutes the influent of this invention, flows on top of the bed 6 in exactly the same way as above described for that of rectangular tanks. In circular tanks, however, having an annular filter channel, the effluent passes over the adjustable weir 8 on an outside wall 46 of the effluent launder 47.

As in the case of the rectangular tank system, the present tank is provided with a cleaner mechanism indicated generally at 19, similar in all respects to that above described except that in this case, the hollow drums shown at 48 are frusto-conical in configuration.

One or more surface rake mechanisms such as that at 49 travels back and forth around the annular filter channel, reversing its direction of movement as the end of its rod 17 contacts with the plate 33 on the cleaner carriage. On its reverse movement around the tank, the opposite end of rod 17 contacts with the plate 33 on the other side of the cleaner and the operation is repeated. Consequently, regardless of the position of the cleaner which would naturally move in one direction only, the rake contacts therewith and its direction of travel is thus changed.

Where desired, two such rake mechanisms may be provided moving in opposite directions. The direction of travel of such rakes is changed, first, when they contact with the cleaner mechanism, and again, when they contact with each other on such reverse travel.

It will be understood, of course, that in some instances, such as where the bed is used to filter materials comparatively low in solids, the cleaner need be operated only infrequently. In such cases, it may remain stationary and inoperative upon the bed for considerable periods, while the surface rakes operate as before to break up the surface film and open up the bed.

In such case, the to and fro movement of the rakes operate as before and may be relied upon alone to restore temporarily the filtering efficiency of the bed above that previously existing. Likewise, the float operated speed control mechanism carried by the rake carriage will operate to increase or decrease the speed of lineal travel of the rakes as the level of liquid above the bed rises or falls respectively.

In all vents, it is to be understood that the rakes themselves are of such a character and move at such a speed as to simply break up the continuity of the film at the surface of the bed without stirring or disturbing the flocs of solids so that they move appreciably upwardly into the liquid. Consequently, the function of the rakes is to break the film with minimum disturbance of the bed material or the flocs caught thereby. Inasmuch, however, as there is some movement of liquid through the bed immediately at the point where the rakes are operating, the broken film constituted by flocs will be plowed deeper and deeper into the bed but will be eventually removed by the cleaner when and if the efficiency of the bed cannot be restored an adequate amount by mere raking. It will be desirable to adjust the height of the rakes and lower them into the bed periodically in order to restore this filtering efficiency but in any case, the movement of the rakes should not be such as to cause a disturbance or stirring up of the flocs into the liquid above the bed.

While the invention has been shown and described with particular reference to specific embodiments, it is to be understood that it is not to be limited thereto but is to be construed broadly and restricted solely by the scope of the appended claims.

I claim:

1. In combination, in a downflow filter system having a filter bed, a bed cleaner and a bed rake, means including an electric motor to independently drive each along the same path over the filter bed, the rake drive means having a reversing switch assembly, and means on the cleaner for contacting and reversing said switch which upon reversal serves to reverse the direction of motion of the rake means.

2. The combination of claim 1 in which the cleaner and rake mechanisms are mounted in a rectangular tank and means at the end portion of the tank for contacting and moving the reversing switch.

3. In combination, in a downflow filter system having an annular filter bed, bed raking mechanism and bed cleaning mechanism, means including an electric motor to move both mechanisms independently along the same path over the annular filter bed, the rake carrying a reversing switch assembly, and means on the cleaner for contacting and reversing said switch, the speed of travel of the rake being greater than that of the cleaner, whereby the former travels back and forth around the bed, contacting with opposite sides of the cleaner and at each contact reversing its direction of travel.

4. In combination, in a downflow filter system having an annular filter bed, a cleaner mechanism movable over the annular filter bed, a bed raking mechanism on each side of the cleaner, means including an electric motor to move each of the mechanisms independently along the same path, each of the rakes carrying a reversing switch assembly, and means on the cleaner and rakes for contacting and reversing said switches, each rake traveling back and forth around a portion of the bed contacting first with the cleaner and then with the other rake and at each contact reversing its direction of travel.

5. In combination, in a downflow filter having a filter bed and means for delivering liquid to the upper surface thereof, a rake and cleaner therefor, means to move each over the filter bed independently of the other, the means for moving the rake being variable in speed, and means responsive to the level of the liquid above the bed to increase the speed of travel of the rake upon rise of the level of the liquid above the bed.

6. In combination, in a downflow filter having a bed, a rake and a deep cleaner therefor, means to move each over the bed independently of the other and means to increase the speed of travel of the rake upon rise of liquid above the bed comprising a float responsive to the liquid level and connected to a speed control mechanism carried by the rake moving means to increase the speed as the float rises.

7. In combination, in a downflow filter system having a bed, a rake and means to move the same thereover, the rake having teeth penetrating the upper surface of the bed and adapted to break up the film of solids formed thereover, and means connected to one rake moving means responsive to a rise in level of liquid over the bed for increasing the speed of travel of the rake thereover.

8. A method of treating a filter bed in a downflow filter in which liquid is delivered to the upper surface of the bed which comprises raking the surface thereof to break up the film of solids formed there without appreciably stirring the material of the film into the liquid above the bed to thereby restore the efficiency of the bed to a point above that before raking, and intermittently segregating and cleaning successive sections of the bed to remove solids caught thereby, and increasing or decreasing the speed of lineal travel of the rake over the bed responsive to the rise or fall respectively of the level of the liquid above the bed.

9. A method of treating a filter bed in a downflow filter which comprises raking the surface thereof to break up the film of solids formed there without appreciably stirring the material of the film into the liquid above the bed to thereby restore the efficiency of the bed to a point above that before raking, and intermittently cleaning sections of the entire bed to remove solids caught thereby and moving the rake over the bed at a lineal speed greater than that of the deep cleaner.

10. A method of increasing the efficiency of a downflow filter bed in which liquid is delivered to the upper surface of the bed which includes raking the surface thereof to break up the film solids thereon, increasing or decreasing the speed of travel of the raking mechanism responsive to a rise or fall respectively of the level of the liquid above the bed, thereby, automatically to increase the rate of flow through the filter bed as the level of the liquid over the bed increases and intermittently segregating and cleaning successive sections of the bed without shutting down the filter.

11. A method of increasing the efficiency of a downflow filter bed in which liquid is delivered to the upper surface of the bed which includes raking the surface thereof to break up the film of solids thereon, varying the speed of travel of the raking mechanism in accordance with a variation in level of the liquid above the bed, and utilizing an increase in the level of the liquid over the bed to increase the speed of travel of the raking mechanism and intermittently segregating and cleaning successive sections of the bed without shutting down the filter.

12. A method of treating a filter bed of the downflow type in which liquid is delivered to the upper surface of the bed which includes breaking the surface thereof with a raking mechanism to break up the film of solids formed there, cleaning sections of the entire bed with a cleaning mechanism, causing the raking mechanism to approach the cleaning mechanism, and utilizing the contact of parts of the mechanisms to reverse the direction of travel of the rake mechanism when it comes into proximity to the cleaner mechanism.

13. A method of treating a filter bed of the down flow type in a rectangular tank in which liquid is delivered to the upper surface of the bed which includes raking the surface thereof with a making mechanism to break up the film of solids formed there, cleaning sections of the entire bed with a cleaning mechanism, relatively moving the raking and cleaning mechanism toward each other and utilizing the contact of parts of the mechanisms to reverse the direction of travel of the rake mechanism when it comes into proximity to the cleaner mechanism and again reversing the direction of travel of the rake mechanism when it comes into proximity to an end of the tank.

14. A method of treating a filter bed of the downflow type in an annular tank in which liquid is delivered to the upper surface of the bed which includes raking the surface thereof with two raking mechanisms to break up the film of solids formed there, cleaning sections of the entire bed with a cleaning mechanism between raking operations, moving the raking and cleaning mechanism along the same annular path, and utilizing the contact of parts of the raking mechanisms with each other and with the cleaning mechanism to reverse the direction of travel of the rake mechanisms when they come into proximity to the cleaner mechanism and again to reverse the direction of travel of the raking mechanisms when they come into proximity to each other.

15. A method of treating a filter bed of the downflow type in an annular tank which includes raking the surface thereof with raking mechanism, moving the said mechanism back and forth around the tank in a predetermined annular path, cleaning sections of the entire bed with a cleaning mechanism moving in one direction along the same path as that of the raking mechanism, reversing the direction of travel of the rake mechanism when it comes into proximity to one side of the cleaner mechanism and again reversing its direction of travel when it comes into proximity to the other side of the cleaner mechanism, and moving the rake mechanism over the bed at a lineal speed greater than that of the rate of travel of the cleaner.

16. In combination, in a downflow filter having a bed, a rake and a deep cleaner therefor, means to move each over the bed independently of the other and means to decrease the speed of travel of the rake upon a fall of level of liquid above the bed comprising a float responsive to the liquid level and connected to a speed control mechanism for the rake drive means.

17. A method of increasing the efficiency of a downflow filter bed in which liquid is delivered to the upper surface of the bed, which method comprises raking the surface thereof to break up the film of solids thereon, utilizing the level of the liquid above the bed for increasing and decreasing the speed of travel of the raking mechanism automatically to increase and decrease the effectiveness of the raking mechanisms as the level of the liquid over the bed increases and decreases respectively and intermittently segregating and cleaning successive sections of the bed while the filter is operating.

18. In a downflow filter having a filter bed, the combination of means for raking the surface thereof to break up the film of solids formed thereon to thereby restore the efficiency of the bed to a point above that before raking, means for segregating successive sections of the bed and cleaning the same, means for driving said cleaning and raking means into colliding engagement with each and means responsive to the colliding engagement to reverse the direction of movement of one of said raking and cleaning means.

CHARLES E. FRASER.